US009377978B2

(12) United States Patent
Maeda

(10) Patent No.: US 9,377,978 B2
(45) Date of Patent: Jun. 28, 2016

(54) IMAGE PROCESSING APPARATUS THAT IMPROVES EFFICIENCY OF POST PROCESSING, CONTROL METHOD FOR IMAGE PROCESSING APPARATUS THAT IMPROVES EFFICIENCY OF POST PROCESSING, AND STORAGE MEDIUM FOR STORING INSTRUCTIONS FOR IMAGE PROCESSING APPARATUS THAT IMPROVES EFFICIENCY OF POST PROCESSING

(75) Inventor: Yuuki Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 12/730,945

(22) Filed: Mar. 24, 2010

(65) Prior Publication Data
US 2010/0245910 A1 Sep. 30, 2010

(30) Foreign Application Priority Data

Mar. 27, 2009 (JP) .................................. 2009-078982

(51) Int. Cl.
G06F 3/12 (2006.01)
G06K 15/00 (2006.01)

(52) U.S. Cl.
CPC ............ G06F 3/1229 (2013.01); G06F 3/1217 (2013.01); G06F 3/1221 (2013.01); Y02B 60/1271 (2013.01)

(58) Field of Classification Search
CPC ........... B65H 2513/51; B65H 2220/01; B65H 2220/02; B65H 2220/03; B65H 2801/27; B65H 2801/31; B65H 2801/47; B65H 2801/24; G03G 15/6541; G03G 15/6544; G03G 2215/00822; G03G 2215/00848; G06F 3/1264; H04N 1/00639; H04N 1/00896; H04N 1/00891
USPC ............ 358/1.13–1.15, 296, 424; 412/11–12, 412/18; 270/1.01; 399/408, 85, 88; 700/223
See application file for complete search history.

(56) References Cited

U.S. PATENT DOCUMENTS 7,346,309 B2 * 3/2008 Nakamura ......... G03G 15/6544 399/408
7,605,931 B2 * 10/2009 Sato ...................... G06F 3/1213 358/1.14
8,019,270 B2 * 9/2011 Fujii ....................... B42C 11/02 399/408
8,057,149 B2 * 11/2011 Kaneko ................ B42C 9/0018 156/64

(Continued)

FOREIGN PATENT DOCUMENTS

JP 2006-199475 A 8/2006
JP 2007-119078 A 5/2007

(Continued)

Primary Examiner — Mohammad Ghayour
Assistant Examiner — Jonathan R Beckley
(74) Attorney, Agent, or Firm — Canon U.S.A., Inc. IP Division

(57) ABSTRACT

A control method for controlling an image processing apparatus, includes causing a sheet processing apparatus to execute a sheet processing of a sheet to be printed by execution of a first print job stored in a storage unit configured to store a plurality of print jobs each of which has received an execution request, controlling a power supply required for the sheet processing to be executed by the sheet processing apparatus, determining whether a second print job in which the sheet processing is executed by the sheet processing apparatus is stored in the storage unit when the sheet processing of the sheet to be printed by the execution of the first print job is executed by the sheet processing apparatus, maintaining the power supply required for the sheet processing by the sheet processing apparatus when the determining step determines that the second print job is stored in the storage unit, and restricting the power supply required for the sheet processing by the sheet processing apparatus when the determining step determines that the second print job is not stored in the storage unit.

7 Claims, 15 Drawing Sheets

(56) References Cited

U.S. PATENT DOCUMENTS

| | | | |
|---|---|---|---|
| 8,289,534 B2 * | 10/2012 | Takahashi | B42B 4/00 358/1.13 |
| 2006/0077418 A1 * | 4/2006 | Nakajima | B41J 3/44 358/1.14 |

FOREIGN PATENT DOCUMENTS

| | | |
|---|---|---|
| JP | 2007-160601 A | 6/2007 |
| JP | 2007-265388 A | 10/2007 |
| JP | 2008-084301 A | 4/2008 |
| JP | 2009-061612 A | 3/2009 |

* cited by examiner

IMAGE PROCESSING APPARATUS THAT IMPROVES EFFICIENCY OF POST PROCESSING, CONTROL METHOD FOR IMAGE PROCESSING APPARATUS THAT IMPROVES EFFICIENCY OF POST PROCESSING, AND STORAGE MEDIUM FOR STORING INSTRUCTIONS FOR IMAGE PROCESSING APPARATUS THAT IMPROVES EFFICIENCY OF POST PROCESSING

BACKGROUND OF THE INVENTION

1. Field of the Invention

The present invention relates to an image processing apparatus, a control method for the image forming processing, and a storage medium.

2. Description of the Related Art

In image processing apparatuses, high productivity is desirable. Environment responsiveness such as electric power saving is becoming important in addition to the high productivity. For example, in the case of performing a binding processing by using a sheet processing apparatus such as a case binding machine and a tape binding machine, which are often used for image processing apparatuses for a print on demand (POD) system, it is necessary to perform warming-up to prepare a glue, a tape, and the like. Since a long time is sometimes required for the preparation, the preparation is one of the factors for lowering the productivity.

For example, in the case of executing a case binding print job by a sheet processing apparatus, it is necessary to perform warming-up of a glue melting unit for melting the glue. When power supply to the glue melting unit is maintained in the case of executing another job in which the case binding processing is not performed after the execution of the case binding job, power consumption is increased.

However, when the power supply to the glue melting unit is cut off immediately after the completion of execution of a case binding job, the temperature of the glue melting unit is lowered and warming-up of the glue melting unit needs to be performed again to execute a subsequent case binding job. Therefore, a long time is required for performing the warming-up of the glue melting unit when the case binding print jobs are intermittently input.

It may be possible to execute a plurality of print jobs, which need case binding processing to be performed, all at once by changing the order of print jobs to be executed. However, it is difficult to keep the original execution order when the order of jobs to be executed is changed, and execution of a job in which the case binding is not performed is postponed. Particularly, in the printing field such as POD, it is not preferable to carelessly shuffle the jobs since each of the jobs has its printing due date.

There has been discussed, in Japanese Patent Application Laid-Open No. 2006-199475, a technique for increasing job processing efficiency, in which warming-up is performed early by estimating a time to be elapsed until a sheet processing operation of a job is started based on the number of sheets to be printed in the job.

More specifically, upon input of the number of sheets to be printed in the job, a time required for warming-up is subtracted from a time to be elapsed from printing of the sheets corresponding to the number of sheets to be printed until the start of a post-processing operation. The warming-up is started at a timing obtained by the subtraction. By employing such technique, it is possible to perform the warming-up only when the job requiring the warming-up is to be executed without performing the warming-up for the jobs other than the job requiring the warming-up.

However, in the conventional technique, it is necessary for the image processing apparatus to recognize the number of sheets to be printed in the job, to calculate the time to be elapsed until the start of sheet processing, thereby raising the needs for complicated processing. For example, since the number of sheets to be printed is changed depending on the number of pages and a printing layout of the job, it is necessary to perform raster image processing (RIP) of all of the pages of the job, to accurately recognize the number of sheets to be printed in the job.

Also, a method in which a user inputs the number of sheets to be printed for each of jobs may be possible. However, such a process is very labor intensive, and the user would be required to know the number of sheets to be printed that are output by the execution of the job. Furthermore, since the user can input an erroneous number of sheets to be printed, the method lacks accurateness.

SUMMARY OF THE INVENTION

According to an aspect of the present invention, an image processing apparatus includes a storage unit configured to store a plurality of print jobs each of which has received an execution request, the plurality of print jobs including at least a first print job stored in the storage unit, a sheet processing unit is configured to cause a sheet processing apparatus to execute a sheet processing of a sheet to be printed by execution of the first print job stored in the storage unit, a supplying control unit is configured to control a power supply required for the sheet processing to be executed by the sheet processing apparatus, and a determining unit configured to determine whether a second print job on which the sheet processing is to be executed by the sheet processing apparatus is stored in the storage unit when the sheet processing of the sheet to be printed by the execution of the first print job is to be executed by the sheet processing apparatus. The supplying control unit maintains the power supply required for the sheet processing by the sheet processing apparatus when the determining unit determines that the second print job is stored in the storage unit, and restricts the power supply required for the sheet processing by the sheet processing apparatus when the determining unit determines that the second print job is not stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
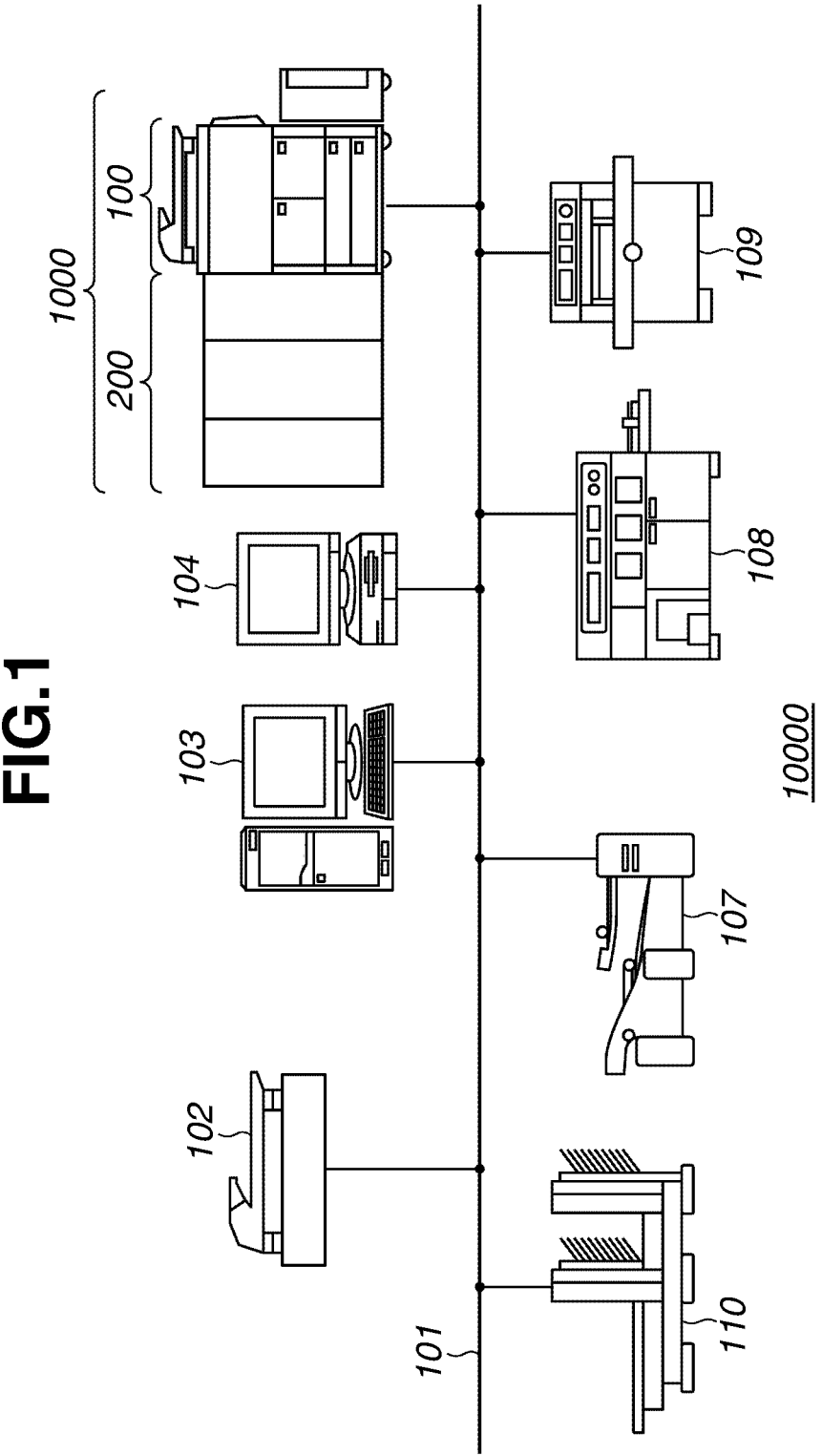
FIG. 1 illustrates a configuration of a printing system.
Figure 2:
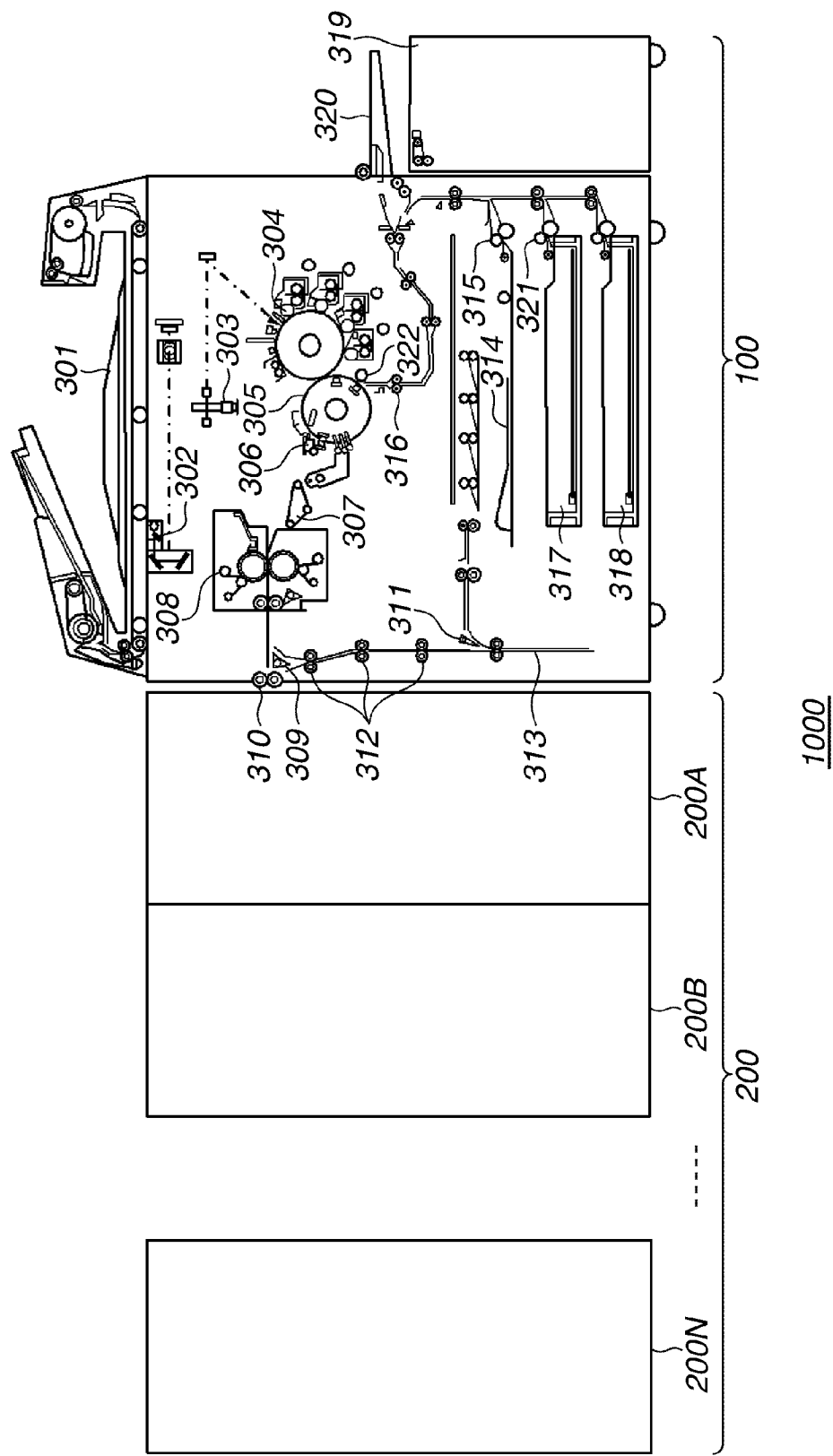
FIG. 2 illustrates the configuration of the printing system.

FIGS. 1 and 2 are diagrams illustrating a configuration of a printing system according to the present exemplary embodiment. Hereinafter, an overall POD system 10000 including a printing system 1000, which is one example of the image processing system, will be described.

The printing system 1000 includes an image forming apparatus 100, which is one example of the image processing apparatus, and a group of sheet processing apparatuses 200. FIG. 2 illustrates that sheet processing apparatuses 200A, 200B, ... 200N that are capable of forming an inline path are connectable as a group of sheet processing apparatuses that are linkable to the image forming apparatus 100. Here, the sheet processing apparatuses 200A, 200B, ... 200N correspond to a paper folding machine, a cutter, a saddle stitch binding machine, and a case binding machine, and the saddle stitch binding machine needs to be connected in relation with the position of the sheet processing apparatus 200N.

The POD system 10000 illustrated in FIG. 1 includes the printing system 1000 of the present exemplary embodiment, a server 103, and a client computer 104 (hereinafter referred to as PC) as constituent elements. Also, the POD system 10000 includes a paper folding machine 107, a cutter 109, a saddle stitch binding machine 110, a case binding machine 108, a scanner 102, and the like. Thus, the POD system 10000 is provided with the plurality of apparatuses.

The printing system 1000 includes the image forming apparatus 100 and the group of sheet processing apparatuses 200 as constituent elements. In the present exemplary embodiment, a multifunction machine including a plurality of functions such as a copy function and a PC printing function is described as one example of the image forming apparatus 100, but the image forming apparatus 100 may be a single function type printing apparatus having a PC function only or a copying function only.

As used herein, the paper folding machine 107, the cutter 109, the saddle stitch binding machine 110, and the case binding machine 108 are defined as the sheet processing apparatus like the group of sheet processing apparatuses 200 included in the printing system 1000.

The above definition is used because the paper folding machine 107 and so forth are capable of executing the sheet processing on a sheet of a job printed by the image forming apparatus 100 included in the printing system 1000.

For example, the paper folding machine 107 is configured to be capable of executing a paper folding processing on a sheet of a job printed by the image forming apparatus 100. The cutter 109 is configured to be capable of executing a cutting processing on a sheet printed by the image forming apparatus 100 by the unit of a bundle of sheets formed of a plurality of sheets.

The saddle stitch binding machine 110 is configured to be capable of executing a saddle stitch binding processing of sheets of a job printed by the image forming apparatus 110. The case binding machine 108 is configured to be capable of executing a case binding processing of sheets of a job printed by the image forming apparatus 100.

However, to execute the various kinds of sheet processing by the sheet processing apparatuses, it is necessary for an operator to perform a work of taking out a printed material of a job printed by the image forming apparatus 100 from a sheet discharge unit of the image forming apparatus 100, and setting the printed material to the sheet processing apparatus that is the object for the processing.

Thus, in the case of using the sheet processing apparatus other than the group of sheet processing apparatuses 200 included in the printing system 1000, the intervening work by the operator is required after the print processing by the image forming apparatus 100.

In other words, in the case of using the group of sheet processing apparatuses 200 provided in the printing system 1000 for executing the sheet processing that is required in the job printed by the image forming apparatus 100, the intervening work by the operator is unnecessary after the print processing is performed by the image forming apparatus 100.

The intervening work is not required because of the structure that the sheet printed out by the image forming apparatus 100 is directly supplied to the group of sheet processing apparatuses 200 from the image forming apparatus 100.

More specifically, as illustrated in FIG. 2, a sheet conveyance path inside the image forming apparatus 100 is configured to be connectable with a sheet conveyance path inside the group of sheet processing apparatuses 200. Thus, the group of sheet processing apparatuses 200 and the image forming apparatus 100 included in the printing system 1000 are in the physically-connected relationship. Also, each of the image forming apparatus 100 and the group of sheet processing apparatuses 200 has a central processing unit (CPU), and the image forming apparatus 100 and the group of sheet processing apparatuses 200 are configured to be capable of data-communicating with each other by the CPUs. Thus, the image forming apparatus 100 and the group of sheet processing apparatuses 200 are in the electrically-connected relationship.

In the present exemplary embodiment, a control unit included in the printing system integrally controls the image forming apparatus 100 and the group of sheet processing apparatuses 200. As one example of the control unit, a controller unit 205 in FIG. 3 inside the image forming apparatus 100 in FIG. 2 performs the integral control. In the present exemplary embodiment, the sheet processing apparatuses are also referred to as post-processing apparatuses or post-press apparatuses.

Among the plurality of apparatuses in the POD system 10000 in FIG. 1, the apparatuses other than the saddle stitch binding machine 110 are connected to a network 101 and configured to be capable of data-communicating with one another. For example, an information processing apparatus, which is one of examples of external apparatuses, such as PC 103 and PC 104, sends via the network 101 print data of a job, which is an object for processing for which a printing execution request has been input. The image forming apparatus 100 receives the sent print data and prints the print data.

Also, the server PC 103 controls all of jobs to be processed by the POD system 10000 by executing data sending/receiving with other apparatuses by way of network communication, for example.

In other words, the server PC 103 functions as a computer for integrally controlling an overall process of a series of work flows formed of a plurality of processing steps. The server PC 103 determines conditions of the post-processing that can be performed by the POD system 10000 based on an instruction of a job received from the operator. Also, the sever PC 103 instructs a post-processing (finishing processing) step according to an order from an end user (a client who placed the order for the printing).

When deciding the post-processing conditions, the server 103 uses an information exchange tool such as a job definition format (JDF) to exchange information with each of the post-processing apparatuses by way of a command and a status inside the post-press apparatus. For example, the server 103 is configured to enable the sheet processing such as a cutting processing, a saddle stitch binding processing, a case binding processing, a sheet folding processing, and a punching processing to be executed on a printed medium of a job on which the print processing has been performed by the image forming apparatus 100.

Hereinafter, an internal structure (mainly software configuration) of the printing system 1000 will be described with reference to FIG. 3.

Figure 3:
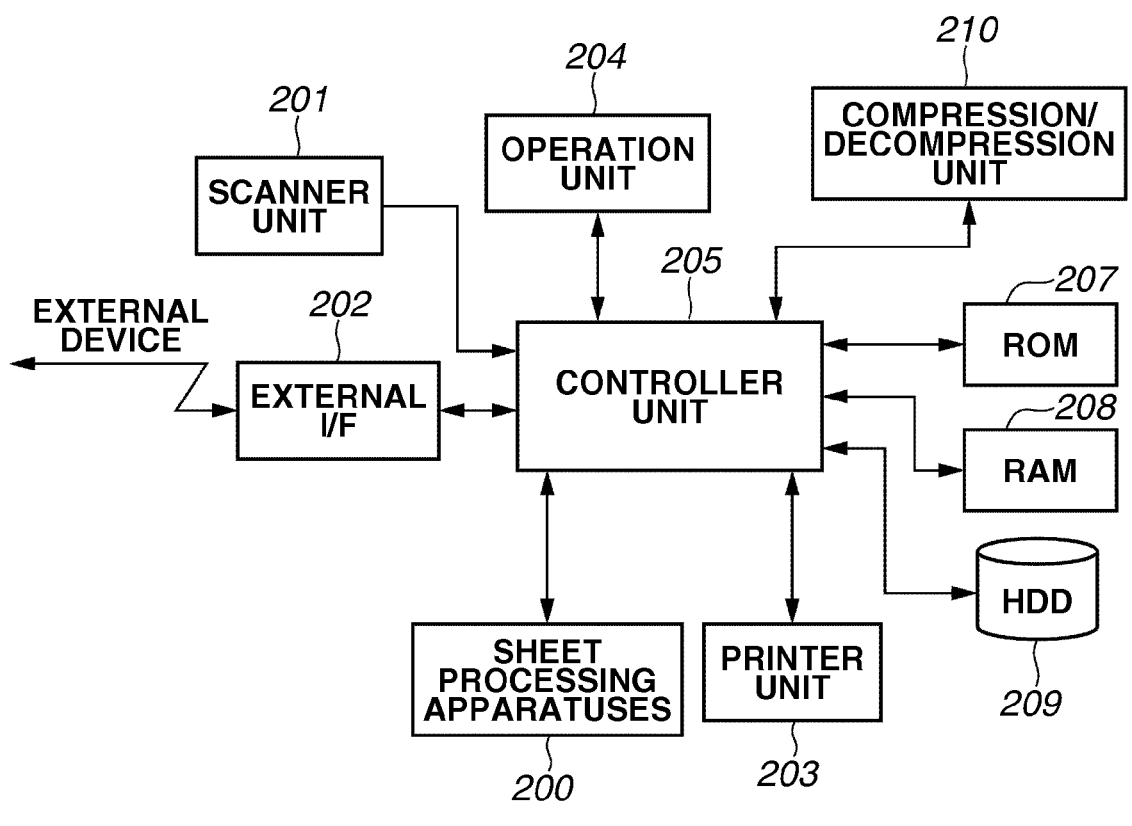
FIG. 3 is a block diagram illustrating the configuration of the printing system.

FIG. 3 is a block diagram illustrating a configuration of a printing system according to the present exemplary embodiment. In the present exemplary embodiment, among the units in FIG. 3 included in the printing system 1000, those other than the group of sheet processing apparatuses 200 are included inside the image forming apparatus 100. Here, the group of sheet processing apparatuses 200 in a strict sense includes a series of sheet processing apparatuses that can be configured by a plurality of inline type sheet processing apparatuses.

In other words, the group of sheet processing apparatuses 200 is sheet processing apparatuses that are attachable to and detachable from the image forming apparatus 100, and are provided as an option of the image forming apparatus 100. Thus, it is possible to achieve an effect of providing a required number of inline finishers in the POD environment. Therefore, the following configuration is established.

The image forming apparatus 100 includes in the inside thereof a nonvolatile memory such as a hard disk (hereinafter also referred to as HDD) 209 that is capable of storing data of a plurality of jobs serving as objects for processing. Also, the image forming apparatus 100 has a copying function for printing, via the HDD and at a printer unit 203, job data received from a scanner unit 201 included in the image forming apparatus 100.

Also, the image forming apparatus 100 includes a printing function and the like for holding job data received from the external apparatuses such as the PC 103 and the PC 104 via an external I/F unit 202 corresponding to one example of a communication unit in the HDD, and printing the job data at the printer unit 203 via the HDD. The image forming apparatus 100 is a multi-function printer (MFP) type printing apparatus (also referred to as image forming apparatus) including the above-described plurality of functions.

In other words, the printing apparatus of the present exemplary embodiment may be a printing apparatus capable of color-printing or a printing apparatus capable of monochrome-printing, and may have any configuration insofar as the printing apparatus is capable of executing the various controls described in the present exemplary embodiment.

The image forming apparatus 100 of the present exemplary embodiment includes the scanner unit 201 that reads an original image and performs an image processing on the read image data. Also, the image forming apparatus 100 includes the external I/F unit 202 that sends and receives image data and the like to and from a facsimile machine, a network-connected apparatus, and an external apparatus. Further, the image forming apparatus 100 includes the hard disk (HDD) 209 capable of storing image data of a plurality of jobs that are objects for printing received from any one of the scanner unit 201 and the external I/F unit 202.

The image forming apparatus 100 includes the printer unit 203 for executing a print processing of a job that is an object for printing stored in the hard disk (HDD) 209. Also, the image forming apparatus 100 includes an operation unit 204 having a display unit, which is one example of a user interface unit, included in the printing system 1000. Other examples of the user interface provided in the printing system 1000 include a display unit, a keyboard, and a mouse of the external apparatuses such as the PC 103 and the PC 104.

The controller unit (also referred to as control unit or CPU) 205, which is one example of the control unit, included in the printing system 1000 integrally controls the processing, operations, and the like of various units included in the printing system 1000.

A read only memory (ROM) 207 stores various control programs required in the present exemplary embodiment including programs for executing various processing of flowcharts illustrated in FIGS. 9, 10, 11, and 14 described below. The ROM 207 also stores a display control program for causing various user interface (hereinafter abbreviated to UI) images to be displayed on the display unit of the operation unit 204 including the UI images illustrated in FIGS. 6, 7, 12, 13, and 15.

The controller unit 205 reads and executes the programs stored in the ROM 207 to cause the present printing apparatus to execute various operations described in the present exemplary embodiment. Programs for executing an operation of interpreting page description language (PDL) code data received from the external apparatus (103, 104, etc.) via the external I/F 202 and for executing an operation of expanding the data into a raster image data (bitmap image data), are also stored in ROM 207. These are processed by software.

The ROM 207 is a read only memory and preliminarily stores various programs such as programs including a boot sequence and font information, the above-described programs, and the like. A random access memory (RAM) 208 is used to store image data sent from the scanner 201 and the external I/F 202 via a memory controller, various programs, and setting information.

The HDD 209 is a large capacity storage unit for storing image data compressed by a compression/decompression unit 210. The HDD 209 is configured to be capable of holding a plurality of data such as print data of a job, which is an object for printing. The controller unit 205 controls, via the HDD 209, data of a job, which is an object for printing, input via the scanner unit 201, various input units of the external I/F unit 202, and the like so that the data are printed by the printer unit 203.

Also, the controller unit 205 performs control for sending the data to the external apparatus via the external I/F 202. As described above, the controller unit 205 controls the various output processing of the jobs, which are objects for printing, stored in the HDD 209 so that the output processing is executed. The compression/decompression unit 210 performs a compression/decompression operation of the image data and the like stored in the RAM 208 and the HDD 209 by various compression methods such as Joint Bi-level Image Experts Group (JBIG) and Joint Photographic Experts Group (JPEG).

With the above-described configuration, the controller unit 205 as one example of the control unit included in the printing system controls the operations of the group of inline type sheet processing apparatuses 200 as illustrated in FIG. 1.

Figure 4:
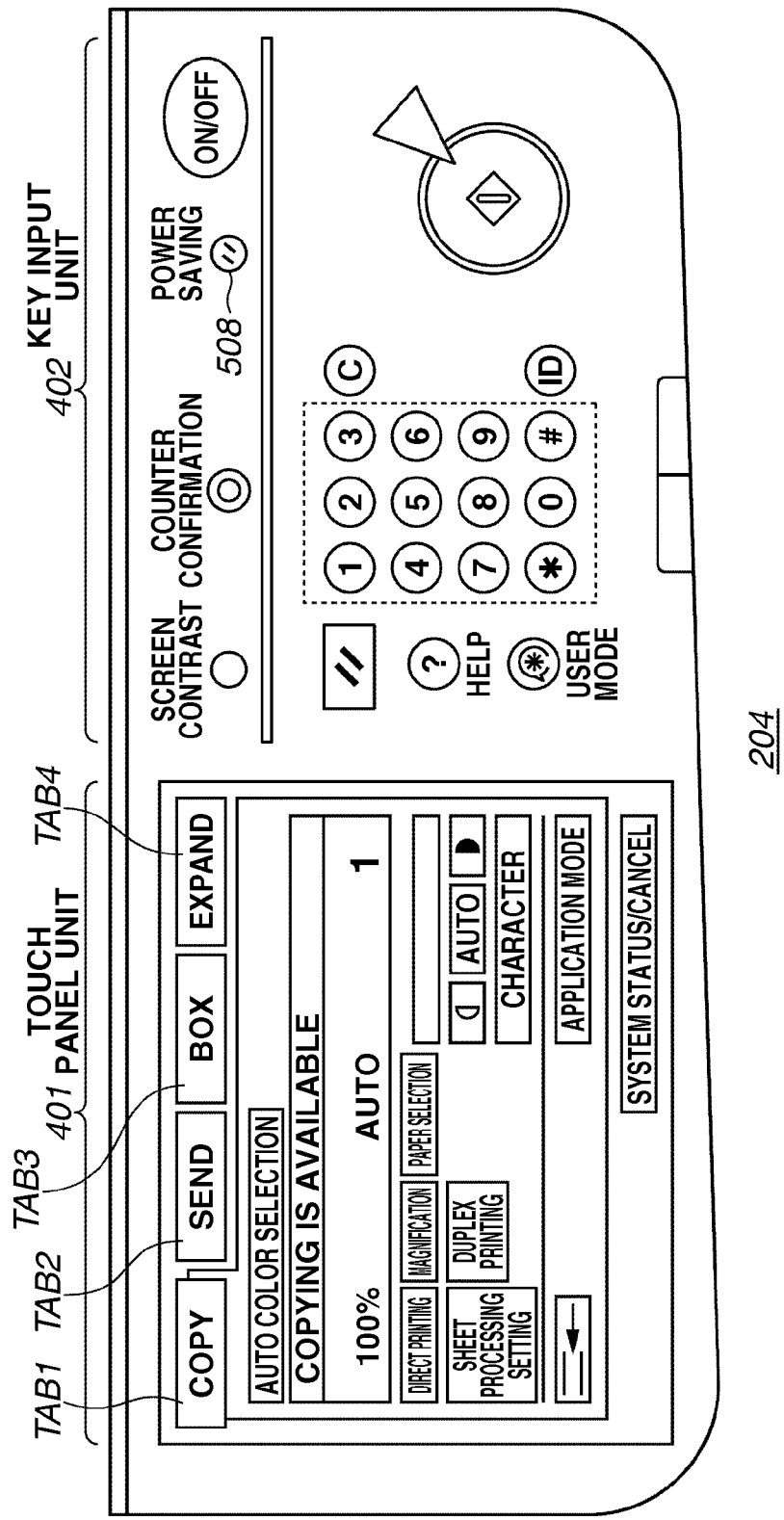
FIG. 4 is a plan view illustrating a configuration of an operation unit illustrated in FIG. 2.
Figure 5:
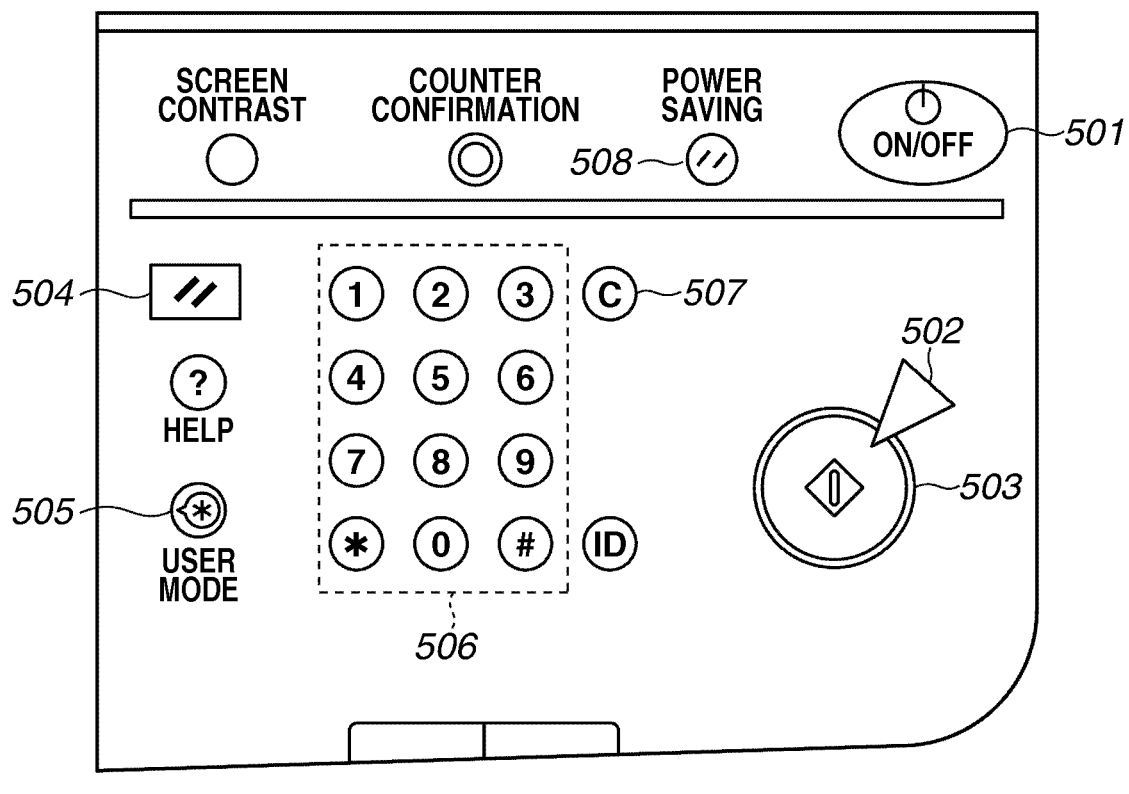
FIG. 5 is a plan view illustrating the configuration of the operation unit illustrated in FIG. 2.
Figure 6:
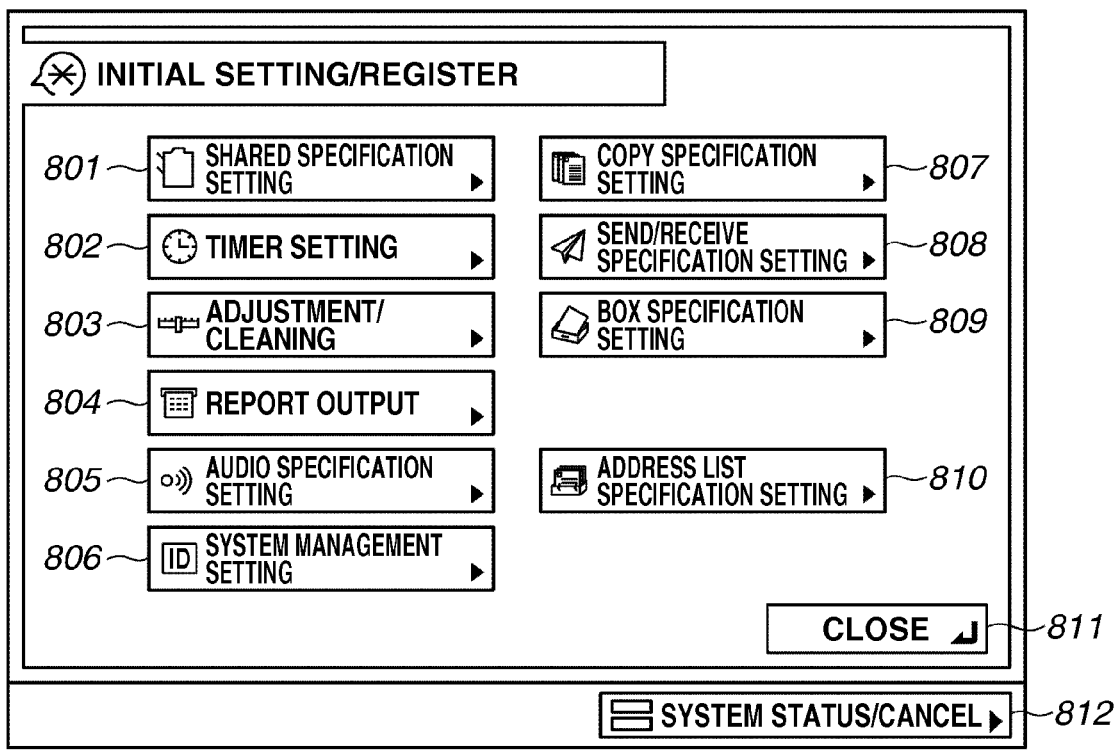
FIG. 6 is a plan view illustrating the configuration of the operation unit illustrated in FIG. 2.

FIG. 4 to FIG. 6 are plan views illustrating a configuration of the operation unit 204 illustrated in FIG. 3. In the present exemplary embodiment, the operation unit 204 is formed of a touch panel unit 401, which is one example of a display unit capable of receiving a user operation by way of soft keys (display keys) and a key input unit 402 capable of receiving a user operation by way of hard keys. The user performs various printing settings by using the user interface displayed on the touch panel unit 401.

Referring to FIG. 4, a power saving state display unit 508 is displayed by way of control by the controller unit 205 when the whole printing system is in a power saving state. TAB1 to TAB 4 are tab keys provided according to function settings for copying, sending, boxing, and expansion.

The key input unit 402 illustrated in FIG. 5 includes an operation unit power source switch 501. The controller unit 205 controls selective switching between a standby mode and a sleep mode in response to a user operation of the operation unit power switch 501. In the standby mode, the image forming apparatus 100 is in a normal operation state, and in the sleep mode, the image forming apparatus 100 is in a state of suppressing power consumption by stopping the programs in a state of waiting for interruption for network printing, facsimile machine, and the like. A power saving state display unit 508 is in a lit display state in the sleep mode and in an extinguished display state in the standby mode.

The controller unit 205 controls a power switch 501 so that the user operation is received thereby in an ON state of a main power switch (not illustrated) that performs a power supply control of the whole system. A start key 503 is a key used for allowing receipt of an instruction from a user for starting a type of job processing instructed by the user, such as a copying operation and a sending operation of a job, which is an object for processing. A stop key 502 is a key used for allowing receipt of an instruction from a user for causing the printing apparatus to stop the processing of received job. A ten key 506 is a key used for inputting entries for various settings executable by the user.

A clear key 507 is a key used for releasing various parameters such as the entries set by the user via the ten key 506. A reset key 504 is used for receiving from the user an instruction for cancelling all the settings set by the user for a job, which is an object for processing and returning the set values to a default state.

A user mode key 505 is a key used for shifting to a system setting screen for each of users. The system setting screen enabling settings for each of users, which is displayed when the user mode key 505 is pressed down, corresponds to that illustrated in FIG. 6.

FIG. 6 is illustrates one example of a system setting screen to be displayed on the touch panel unit 401 illustrated in FIG. 4.

Referring to FIG. 6, a shared specification setting button 801 is used for inputting settings that are shared by the whole printing system 1000 in a job-type-independent manner.

A timer setting button 802 is a button used for enabling instructions for a time to shift to the sleep mode, adjustment of time inside the apparatus, and the like. An adjustment/ cleaning button 803 is a button used for enabling instructions for image adjustment such as density adjustment, and contrast adjustment, and a cleaning of a wire and a roller. A report output button 804 is a button used for printing out a user history, a setting list, and the like of a facsimile or a printer. An audio specification setting button 805 is a button used for inputting settings for audio guidance and audio recognition.

A system management setting button 806 is a button used for changing settings of the whole image forming apparatus 1000, which can be set by the user having the management authority. A copying specification setting button 807 is a button used for changing settings specific to the case of using the copying function. A sending/receiving specification setting button 808 is a button used for changing settings specific to the case of using sending/receiving functions such as "FAX" and "Send".

A box specification setting button 809 is a button used for changing settings specific to the case of using a box function. An address list specification setting button 810 is a button for changing settings for registration and the like of addresses and an address list. A close button 811 is a button used for returning to an initial screen illustrated in FIG. 7. A system status button 812 is a button used for enabling to confirm a condition of the printing system 1000.

Figure 7:
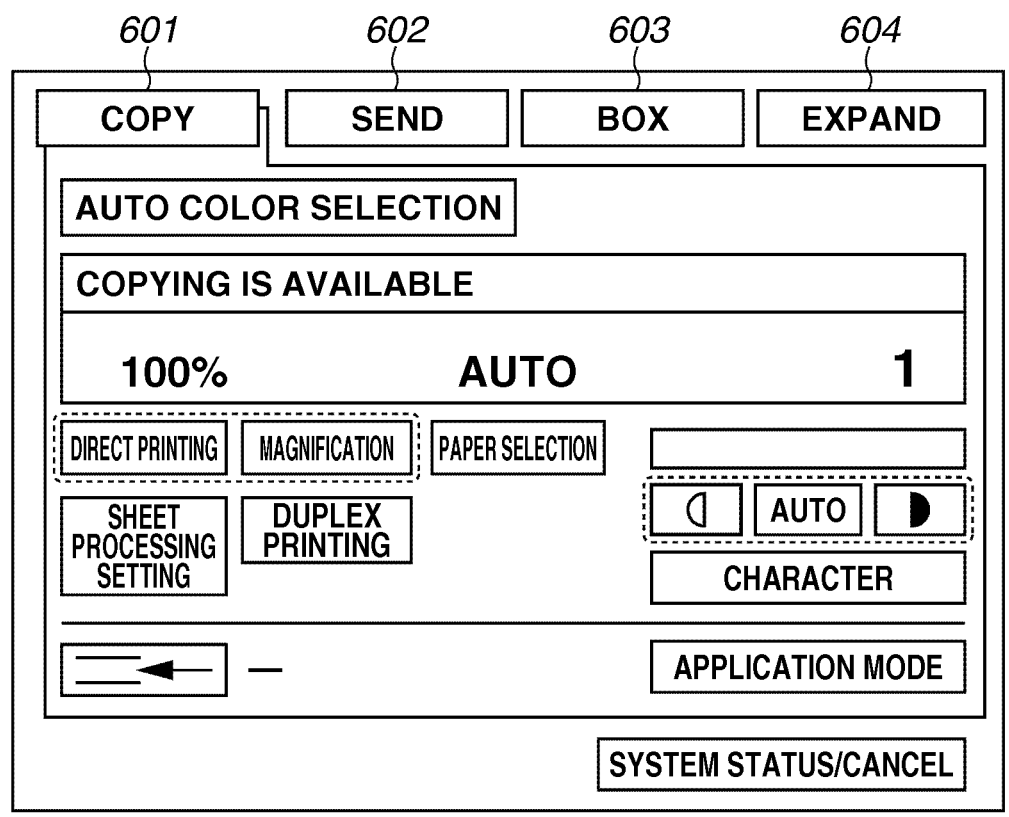
FIG. 7 illustrates an initial setting screen displayed on a touch panel unit.

FIG. 7 is a diagram illustrating one example of the initial setting screen displayed on the touch panel unit 401 illustrated in FIG. 4. Hereinafter, a configuration of the touch panel unit (hereinafter also referred to as display unit) 401 corresponding to one example of the user interface unit provided by the printing system will be described.

Referring to FIG. 7, the touch panel 401 has a liquid crystal display (LCD) and a touch panel display including a transparent electrode attached on the LCD. The touch panel unit 401 has both of a function of receiving various settings from an operator and a function of presenting information to the operator.

For example, upon detecting that a part of the LCD corresponding to a display key in an effective display state is pressed down by a user, the controller unit 205 performs controlling as follows. The controller unit 205 performs control to enable display of an operation screen according to the key operation on the touch panel unit 401 based on the display control program preliminarily stored in the ROM 207.

Note that FIG. 7 is one example of the initial screen to be displayed on the touch panel unit 401 when a state of the present printing apparatus is in the standby mode (in a state where there is not any job to be processed by the printing apparatus). When a copy tab 601 on the touch panel unit 401 illustrated in FIG. 7 is pressed down by the user, the controller unit 205 causes an operation screen of the copying function included in the present printing apparatus to be displayed on the touch panel unit 401.

When a send tab 602 is pressed down by the user, the controller unit 205 causes an operation screen of the data transmission (Send) function such as facsimile transmission and E-mail transmission included in the present printing apparatus to be displayed on the touch panel unit 401. When a box tab 603 is pressed down by the user, the controller unit 205 causes an operation screen of the box function included in the present printing apparatus to be displayed on the touch panel unit 401. A tab 604 is an expand tab.

Screens to be displayed when the tabs are selected and contents of the buttons will not be described in this specification.

Figure 8:
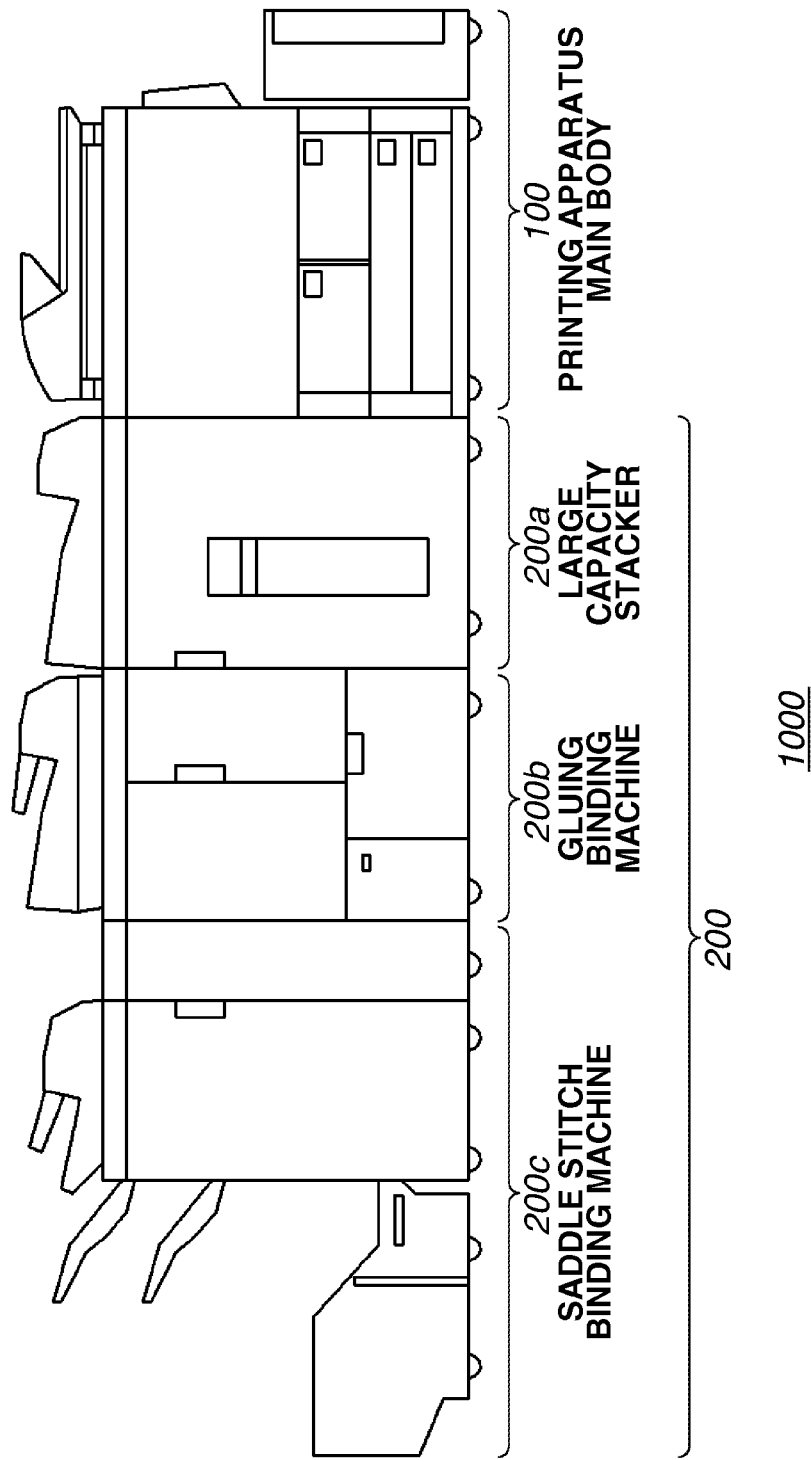
FIG. 8 illustrates an inline configuration of the printing system.

The present exemplary embodiment includes a system configuration capable of configuring a system configuration illustrated in FIG. 8, for example, as the printing system 1000 illustrated in FIG. 1 to FIG. 3.

FIG. 8 illustrates an inline configuration of the printing system 1000 illustrated in FIG. 1. In the present exemplary embodiment, the printing system 1000 includes a large capacity stacker, a gluing binding machine, a saddle stitch binding machine, and 3 inline type sheet processing apparatuses as a series of the group of sheet processing apparatuses 200.

The large capacity stacker 200a, the gluing binding machine 200b, and the saddle stitch binding machine 200c are connected in this connection order to the image forming apparatus 100 in the printing system 1000. The controller unit 205 corresponding to one example of the control unit included in the printing system 1000 integrally controls the printing system 1000 including the system configuration illustrated in FIG. 8.

In this example, the large capacity stacker 200a is the sheet processing apparatus capable of accumulating a large number of sheets (e.g. 5000 sheets) from the printer unit 203. The gluing binding machine 200b of the present exemplary embodiment is the sheet processing apparatus capable of executing the case binding processing requiring a sheet gluing processing for binding a bundle of sheets printed by the printer unit 203 together with a front page.

Also, a back gluing binding processing corresponding to a sheet processing for glue-binding without a front page is executable by the gluing binding machine. Since the gluing binding machine is the sheet processing apparatus that is capable of executing at least the case binding processing, the gluing binding machine is also referred to as a case binding machine. The back gluing binding processing and the case binding processing are collectively referred to as the gluing binding processing or simply as a binding processing.

The saddle stitch binding machine 200c is the sheet processing apparatus capable of selectively executing a stapling processing, a punching processing, a cutting processing, a shifted sheet discharge, a saddle stitch binding processing, and a paper folding processing on a sheet from the printer unit 203.

Here, as a highly important point of the present invention, operations and problems of the case binding machine will be described. As described above, for binding a bundle of sheets together with a front page, the processing of gluing the front page to the sheets is performed as the processing of the case binding machine, and it is necessary to melt the glue as a pre-processing for performing the gluing processing.

Accordingly, to start the case binding job from a state in which the glue is not molten, it is necessary to heat a gluing unit to melt the glue, thereby generating a waiting time until the glue is liquefied and applicable. Hereinafter, the state in which heating is performed for melting the glue is referred to as a heating state.

Further, when power of a heater included in the gluing unit for melting the glue after finishing the case binding processing, the glue is solidified over time. Therefore, it is necessary to perform the heating again for performing the case binding processing again. Hereinafter, the state in which the power of the heater is restricted or lowered is referred to as a sleep state or a power saving mode. As used herein, the state in which power is restricted means a state of supplying power that is lower than a predetermined power required for keeping the gluing unit to a temperature required for melting the glue used for the case binding processing.

Further, to eliminate the necessity of re-heating, it is necessary to prevent the solidification of the glue by maintaining the standby state by keeping the power of the heater for melting the glue to a certain degree of power. Hereinafter, the state of keeping the power of the heater to the certain degree to prevent the solidification of the glue is referred to as a standby state or a standby mode.

That is, the standby state means a state in which the sheet processing apparatus is kept to a state of being capable of post-processing. Thus, the controller unit 205 is capable of reducing the power consumption by shifting the case binding machine to the power saving mode and of expediting the start of execution of the subsequent job by shifting the case binding machine to the standby mode.

As a highly important point, in the case of performing the case binding processing, a waiting time until the glue is liquefied in the heating state is generated when the case binding machine is not in the standby state even if the job has been started.

Particularly, the generation of waiting time is the problem that must preferentially be solved in printing systems for POD in which high productivity is important. Meanwhile, if the standby state is maintained to continuously prevent the generation of waiting time, it is undesirable from the viewpoint of power saving since the printing apparatus continuously consumes power. Therefore, it is important to provide a control system capable of keeping the smallest possible wasteful waiting time and power consumption in the printing systems including the post-processing apparatus that requires the pre-processing such as the warming-up.

Here, when a print job in which a post-processing that requires a pre-processing such as the warming-up is input, a method for estimating a time required for the pre-processing and performing the pre-processing of the post-processing apparatus before a processing of the print job is started may be considered as a method for solving the above-described problem. For such a method, it is necessary to accurately estimate a termination time of the print job that is currently held in the HDD 209 and waiting for printing, in addition to the estimation of the pre-processing time such as warming-up of the processing of the print job.

More specifically, if it is determined that a print job in which a post-processing that requires the pre-processing such as warming-up is input, a time required for the pre-processing such as warming-up of the print job is estimated.

It may be possible to estimate the time by registering a pre-processing time that is preliminarily determined depending on the type of post-processing apparatus to the printing system 1000.

Subsequently, a termination time of a print job that has been input before the print job and waiting for printing is estimated. It is necessary to calculate the termination time from the number of pages, the number of copies, and presence/absence of post-processing of all of print jobs in the print queue.

That is, it is essential that all of the pages of all of the print jobs waiting for printing are interpreted by the ROM 207 and stored in the HDD 209. Further, for the accurate estimation, it is necessary to estimate a time to be elapsed until printing of the first sheet to be discharged is completed by executing the job.

However, at the time point when the job in which the specific post-processing is performed was input, it is sometimes difficult to perform the termination time estimation of the print job waiting for printing in printing systems for POD. More specifically, generation of print interruption factor such as occurrence of jam and sheet supply/exchange, for example, is not assumed at the time point when the job in which the specific post-processing is performed was input.

The termination time estimation also becomes difficult when a print job waiting for printing is cancelled or when an interrupt printing occurs. Further, image adjustment and the like in the printing system 1000 are considered to be the print cancel factor.

In the present exemplary embodiment, in the case of performing a post-processing requiring a pre-processing and the like, it is determined whether a similar subsequent job is present after termination of a job that requires the post-processing in view of the above-described problems. A control for flexibly performing the shift to the sleep state or the standby state based on a result of the determination will be described below.

By the above procedure, it is possible to provide a mechanism for keeping the smallest possible wasteful waiting time and power consumption (cost) without performing complicated processing such as the job termination time estimation. The controller unit 205 corresponding to one example of the control unit included in the printing system 1000 of the present exemplary embodiment executes the following controls as described by way of example.

A first exemplary embodiment of the present invention will be described by using flowcharts illustrated in FIGS. 9 and 10. To start with, a processing of a job received by the printing system 1000 according to the present exemplary embodiment will be described referring to the flowchart illustrated in FIG. 9.

Figure 9:
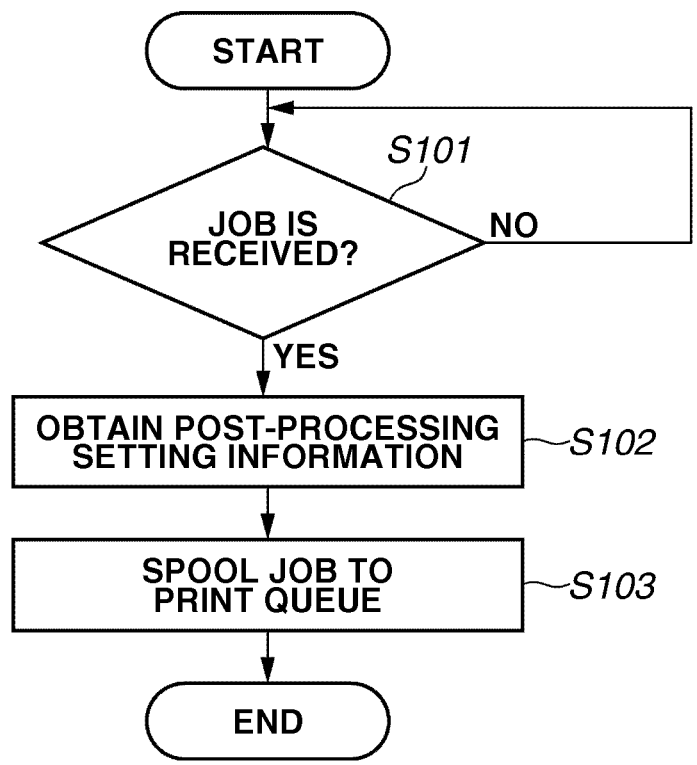
FIG. 9 is a flowchart illustrating a job processing procedure of the printing system.

FIG. 9 is the flowchart illustrating a job processing procedure of the printing system according to the present exemplary embodiment. The present exemplary embodiment is one example of processing a print job received from the external I/F 202. Each of steps is realized when the controller unit 205 loads the control programs stored in the ROM 207 and the HDD 209 to the RAM 208 and executes the programs.

In step S101, when a print job is received by the controller unit 205 (YES in step S101), the processing proceeds to step S102 to obtain a post-processing setting for the received print job. Next, in step S103, print jobs received from the external I/F 202 are sequentially saved in a print queue of the HDD 209 as jobs waiting for printing, and stored in the HDD 209 after being associated with the post-processing setting of the previously obtained print job.

Here, though it is described that the post-processing setting is obtained and stored, it is necessary to interpret PDL to know absence/presence of a post-processing setting when the print job is a PDL job received from the external I/F 202. However, since only the post-processing setting is required in step S102 in the present exemplary embodiment, it is unnecessary to interpret all of pages of the PDL during spooling to the HDD 209. Therefore, a configuration in which the ROM 207 independently interprets the spooled PDL job after the spool to the HDD 209 is employed.

Of course, the exemplary embodiments of the present invention are not restricted to the above-described one, and a configuration of interpreting all of PDL jobs before spooling to the HDD 209 may be employed. A flow of interpreting the PDL job is omitted in this specification.

Next, the controller unit 205 starts a print processing of the spooled jobs waiting for printing.

Figure 10:
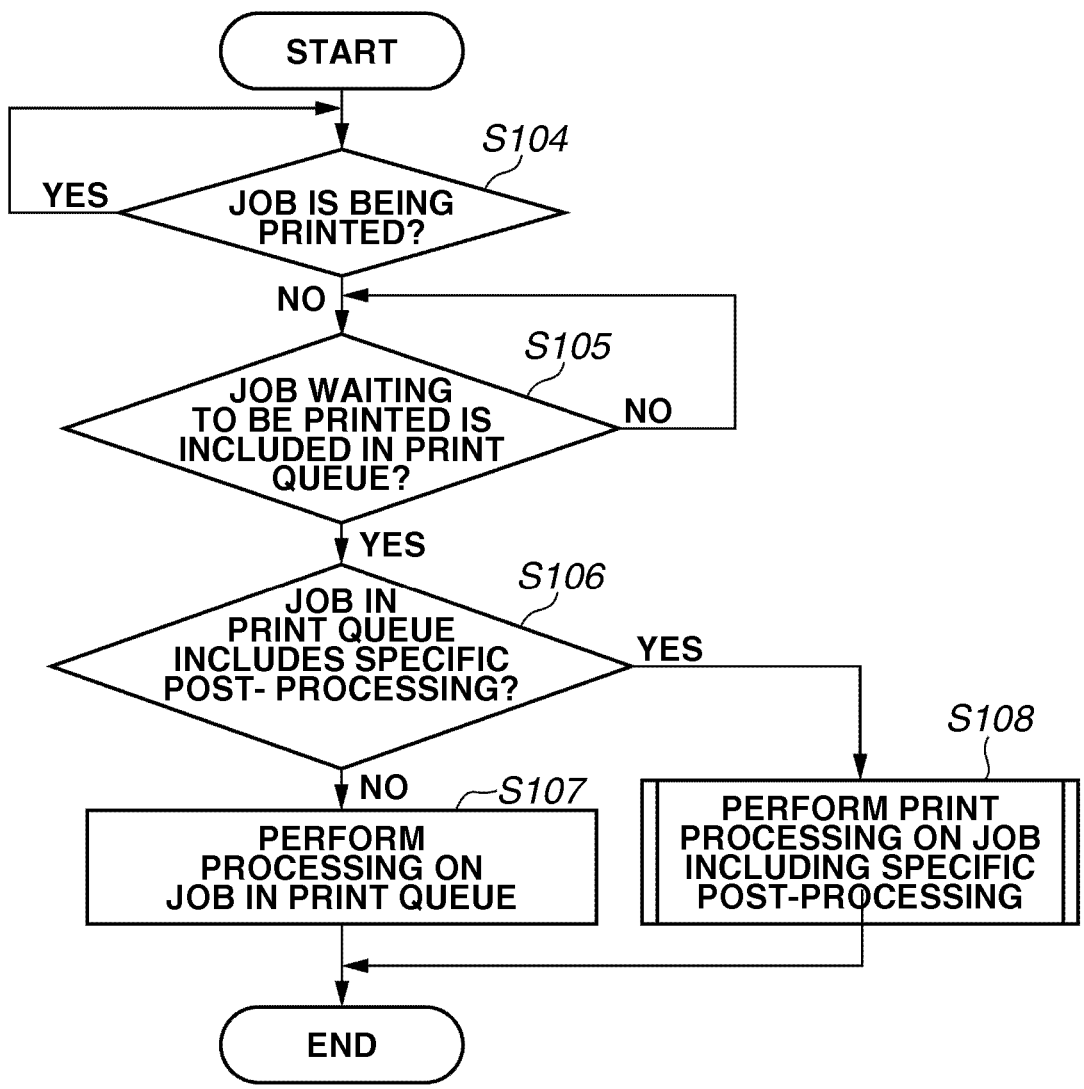
FIG. 10 is a flowchart illustrating a job processing procedure of the printing system.

FIG. 10 is the flowchart illustrating one example of a job processing procedure in the printing system according to the present exemplary embodiment. The present example is one processing example of the print job that is received from the external I/F 202 and spooled to the HDD 209. Each of steps is realized when the controller unit 205 loads the control programs stored in the ROM 207 and the HDD 209 to the RAM 208 and executes the programs.

In step S104, the controller unit 205 detects termination of a print processing in the printer unit 203. When the controller unit 205 detects the termination of the print processing (No in step S104), i.e. when no job is being printed, the processing proceeds to step S105. In step S105, the controller unit 205 determines whether there is a job that is spooled to the HDD 209 in step S103 and waiting for printing, and when it is determined that there is the spooled job (YES in step S105), the processing proceeds to step S106.

In step S106, the controller unit 205 obtains a post-processing setting of the job that is stored in step S103 and to be performed subsequently, and determines whether the post-processing setting is the specific post-processing that requires a pre-processing such as warming-up. Here, when the controller unit 205 determines the job to be a job that does not require the pre-processing such as warming-up (NO in step S106), the processing proceeds to step S107 to perform an ordinary print processing, thereby terminating the present processing.

Figure 11:
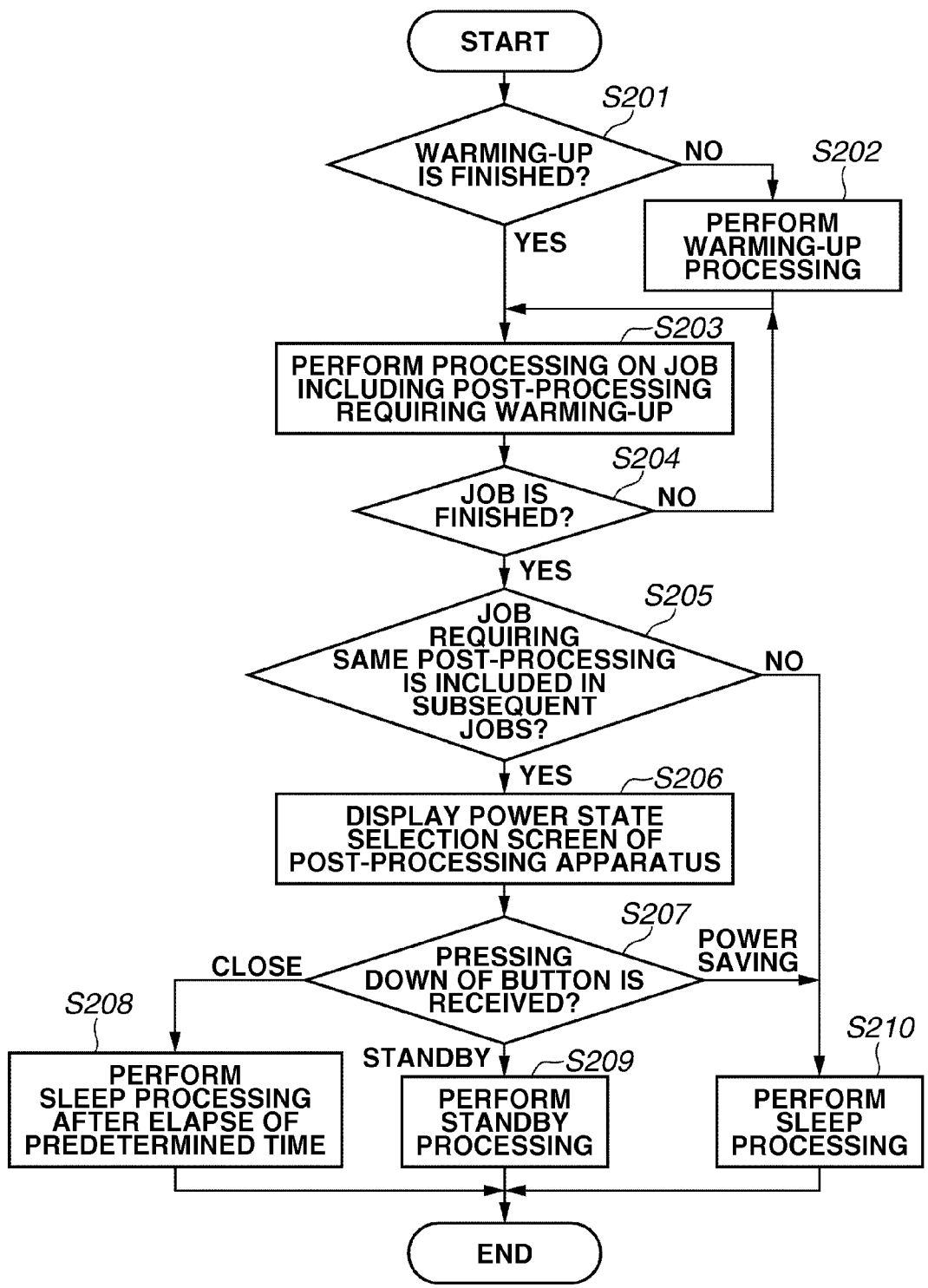
FIG. 11 is a flowchart illustrating a job processing procedure of the printing system.

Meanwhile, in step S106, when the control unit 205 determines that the job includes the post-processing requiring the pre-processing such as warming-up (YES in step S106), the processing proceeds to step S108 to start the control illustrated in FIG. 11, which is characteristic in the exemplary embodiment of the present invention.

FIG. 11 is a flowchart illustrating one example of a job processing procedure in the printing system according to the present exemplary embodiment. The present example is one processing example of the job including the specific post-processing. Each of steps is realized when the controller unit 205 loads the control programs stored in the ROM 207 and the HDD 209 to the RAM 208 and executes the programs.

Here, the controller unit 205 starts control of print processing based on print job settings that have been received and held in the HDD 209 (or RAM 208). The HDD 209 is provided with a job storing function for storing the jobs sequentially received via the external I/F 202. The controller unit 205 is provided with a supply control function for controlling power supply, and controls the power supply to one of the sheet processing apparatuses for which the warming-up processing should be preliminarily performed according to a procedure described below. Here, the controller unit 205 does not execute a processing of analyzing the job when performing the power control.

Also, in the present exemplary embodiment, the case binding processing will be described as the post-processing that requires the pre-processing such as warming-up. However, the present invention is not limited to this configuration. It is possible to apply the present invention to any embodiment that requires heating, such as other gluing binding processing including the back gluing binding processing, the tape binding processing, and a glosser processing.

Hereinafter, processing, for performing power control by determining whether a job requiring the pre-processing such as warming-up exists among jobs stored in the HDD 209 when a job requiring the post-processing by the group of sheet processing apparatuses is terminated, will be described.

First, in step S201, the controller unit 205 confirms a state of the case binding machine 200b to determine whether the glue melting processing has already been terminated, i.e. whether the warming-up has been finished. The processing proceeds to step S202 when the controller unit 205 determines that the glue melting processing has not been terminated (NO in step S201), while the processing proceeds to step S203 when the controller unit 205 determines that the state allows the start of the case binding processing at any time (YES in step S201).

In step S202, the controller unit 205 performs the glue melting processing (warming-up processing) by performing power control for maintaining the glue container of the case binding machine 200b to the heating state. When the operation of the case binding processing becomes possible after termination of the glue melting processing, power control for keeping the power of the case binding machine 200b to the standby state is performed. Then, the processing proceeds to step S203.

In step S203, print processing of the job waiting for printing and requiring a case binding processing as well as the case binding processing is performed by the image forming apparatus 100 and the case binding machine 200b. When the controller unit 205 determines in step S204 that the case binding processing and the print processing are terminated (YES in step S204), the processing proceeds to step S205.

In step S205, the controller unit 205 obtains post-processing setting information stored in step S103 among the jobs that have been spooled to the HDD 209 and are waiting for printing and determines whether there is a job requiring the case binding processing that has been performed before. The processing proceeds to step S210 when the controller unit 205 determines that there is no job requiring the case binding processing in the subsequent jobs waiting for printing (NO in step S205), while the processing proceeds to step S206 when the controller unit 205 determines that there is the job requiring the case binding processing.

Figure 12:
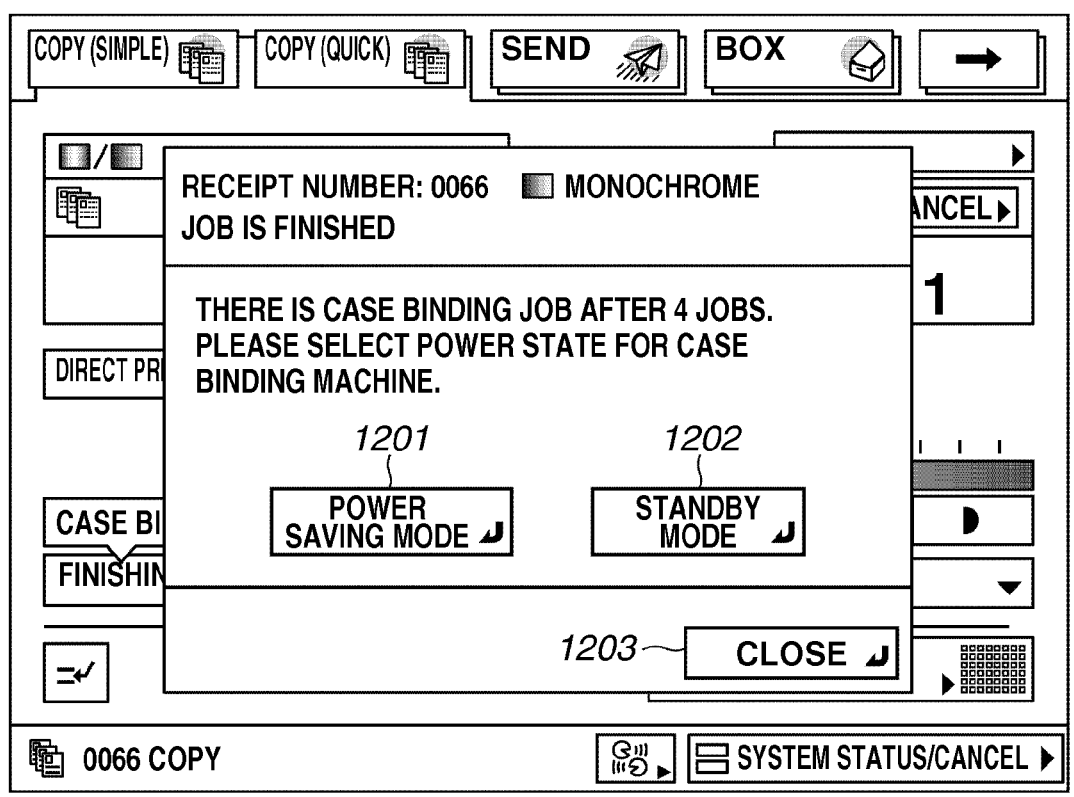
FIG. 12 illustrates a power control selection screen displayed on the touch panel unit.

In step S206, the controller unit 205 obtains an order of the case binding jobs determined in step S205, and performs control to enable display of the power control selection screen of the case binding machine 200b illustrated in FIG. 12 on the touch panel unit 401, and the processing proceeds to step S207. Thus, in the present exemplary embodiment, when the controller unit 205 determines that there is the job requiring the pre-processing, the display control for displaying by the use of the user interface illustrated in FIG. 12 indicating the order of the job requiring the pre-processing is performed.

In other words, the user can recognize the timing for executing the job requiring the pre-processing after the execution of the current job. Therefore, the user can decide whether to shift to the power saving mode or shift to the standby mode in view of the timing for executing the job requiring the pre-processing and by the user's intention.

For example, the user can instruct the shifting to standby mode when the timing for executing the job requiring the pre-processing is early, or can instruct the shifting to power saving mode when the timing for executing the job requiring the pre-processing is late.

The controller unit 205 performs control to keep the job being executed without stopping the job while the screen illustrated in FIG. 12 is being displayed. Therefore, it is possible to prevent degradation in job processing efficiency.

when the execution of the processed job is completed during the display of the screen illustrated in FIG. 12, the number of jobs displayed in FIG. 12 may be lessened according to the completion. Thus, the user can more accurately recognize the timing for staring execution of the job requiring the pre-processing.

When the controller unit 205 detects that a power saving button 1201 is pressed down in step S207, the processing proceeds to step S210 to perform control for execution of the sleep processing, turning off the power of the heater for melting the glue, and returning to the basic screen illustrated in FIG. 7.

Meanwhile, in step S207, when the controller unit 205 detects that a standby button 1202 is pressed down, the processing proceeds to step S209. In step S209, the controller unit 205 performs execution of the standby processing and power control for keeping the heater for melting the glue to a constant output to prevent glue solidification. Then, the processing returns to the basic screen illustrated in FIG. 7.

In step S207, when the controller unit 205 determines that a close button 1203 is pressed down, the processing proceeds to step S208. In step S208, the controller unit 205 performs power control for keeping the standby state until a predetermined time and perform control for shifting to the sleep state after the predetermined time has elapsed.

Figure 13:
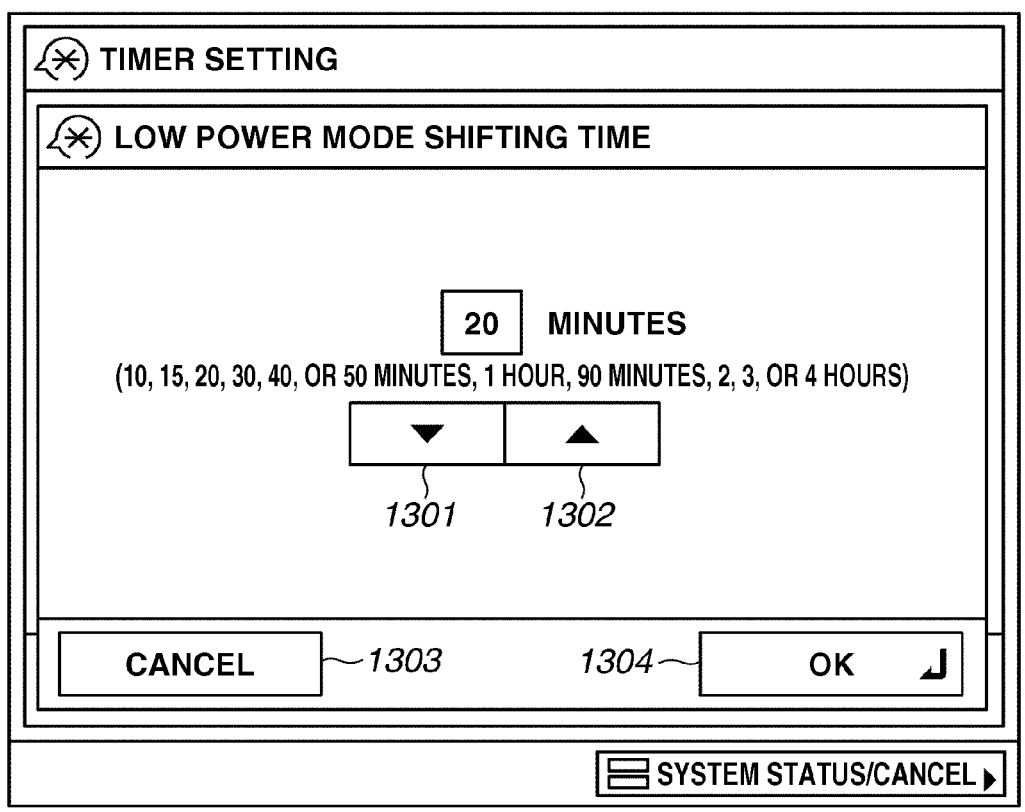
FIG. 13 illustrates a time setting screen displayed on the touch panel unit.

For the setting of the predetermined time, it is possible to change, on a screen as illustrated in FIG. 13, the setting by instructing a change in low power mode shifting time setting by pressing down the time setting button 802 using the user mode key 505 in the key input unit 402.

FIG. 13 illustrates one example of a timer setting screen displayed on the touch panel unit 401 illustrated in FIG. 4. Referring to FIG. 13, it is possible to set a time to shift to a lower power mode by way of a shifting time increase/decrease button 1301 and a button 1302, and the low power mode shifting time is held in the RAM 208 when an OK button 1304 is pressed down. A cancel button 1303 is used for canceling the lower power mode shifting time.

In the present exemplary embodiment, as an operation when the close button 1203 (see FIG. 12) is pressed down, the shift to the low power mode is performed according to a timer setting. However, it is not limited to this, and it is possible to control the case binding machine to shift to the power saving mode of low power consumption in synchronization with a timing at which the image forming apparatus 100 shifts to the low power consumption mode.

By the above-described control, it is possible to achieve both of the improvement in job processing efficiency and the reduction in power consumption without performing the complicated processing of estimating the time to be elapsed until the start of a sheet processing of a job.

In the above-described exemplary embodiment, in step S207, the determination of whether to shift to the standby mode or shift to the power saving mode is made upon instruction from the user. However, when the user's instruction is not given for a predetermined time after the display of the screen illustrated in FIG. 12, the controller unit 205 may shift the case binding machine to the power saving mode. The predetermined time may be instructed by the user.

Figure 14:
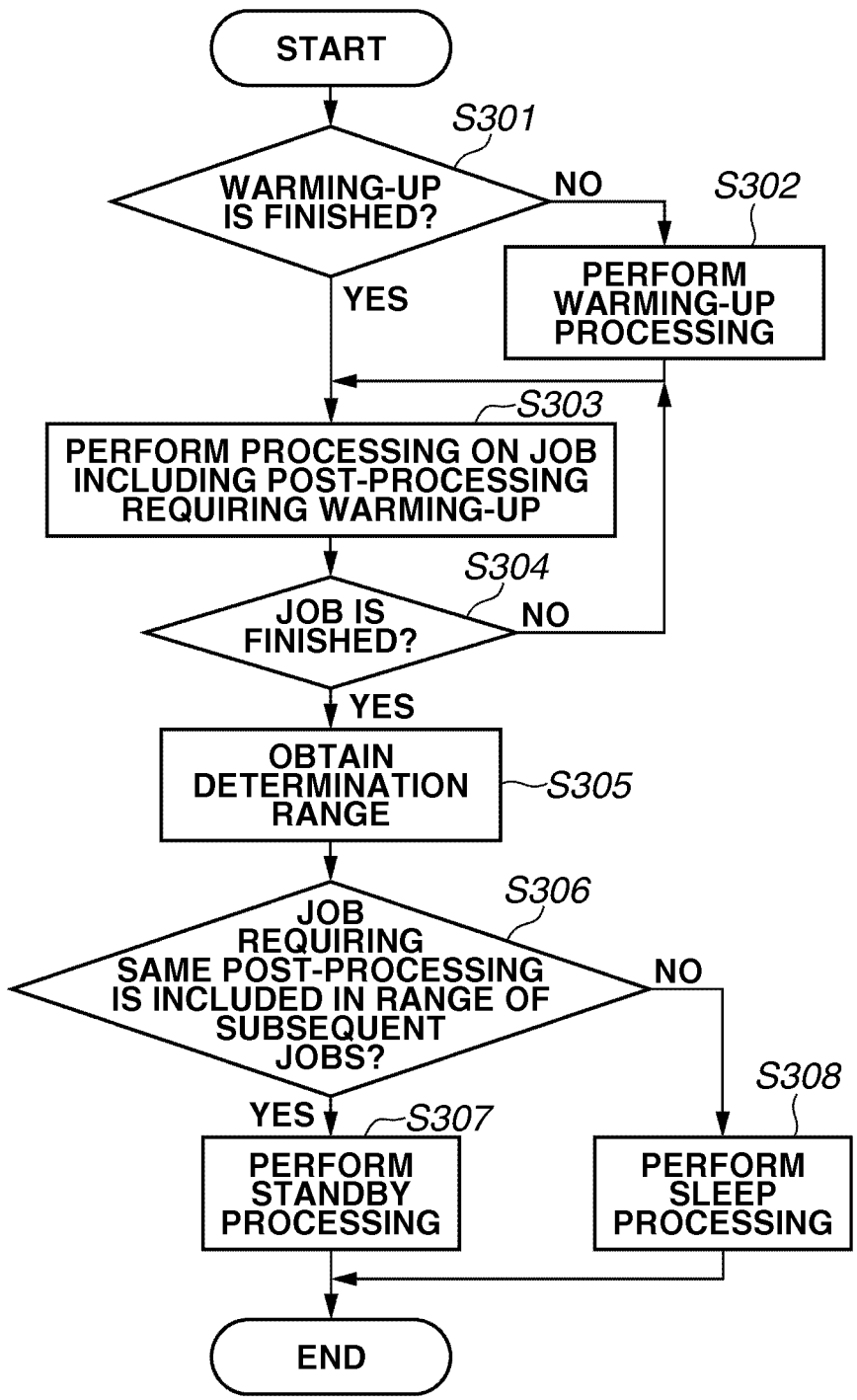
FIG. 14 is a flowchart illustrating a job processing procedure of the printing system.

Hereinafter, details of a second exemplary embodiment will be described referring to FIG. 14. FIG. 14 is a flowchart illustrating one example of a job processing procedure in the printing system according to the present exemplary embodiment. The present example is one example of a processing performed on a job including a specific post-processing. Each of the steps is realized when the controller unit 205 loads the control programs stored in the ROM 207 and the HDD 209 to the RAM 208 and executes the programs.

Here, the flows illustrated in FIGS. 9 and 10 from the receipt of a print job to the start of printing will not be repeated since the flows are similar to those of the first exemplary embodiment, and a control flow from step S108 in FIG. 10, which is highly important in the present exemplary embodiment, is described below. Though the case binding processing is described as a post-processing requiring the pre-processing such as warming-up by way of example in the present exemplary embodiment, too, the present invention is not limited to the example.

First, in step S301 in FIG. 14, the controller unit 205 confirms a state of the case binding machine 200b, and determines whether the glue melting processing has already been terminated, i.e. whether the warming-up has been finished. Here, when the controller unit 205 determines that the glue melting processing has not been terminated (NO in step S301), the processing proceeds to step S302. When the controller unit 205 determines that the state allows the case binding processing to be started at any time (YES in step S301), the processing proceeds to step S303.

In Step S302, the controller unit 205 performs power control to keep a glue container of the case binding machine 200b to the heating state to perform the glue melting processing. In a state where the glue melting processing is finished and the case binding processing is operated at any time, the controller unit 205 performs power control to keep the power of the case binding machine 200b to the standby state, and the processing proceeds to step S303.

In step S303, print processing of the job waiting for printing and requiring a case binding processing as well as the case binding processing are performed by the image forming apparatus 100 and the case binding machine 200b. In step S304, when the controller unit 205 determines that the case binding processing and the print processing are terminated (YES in step S304), the processing proceeds to step S305.

Figure 15:
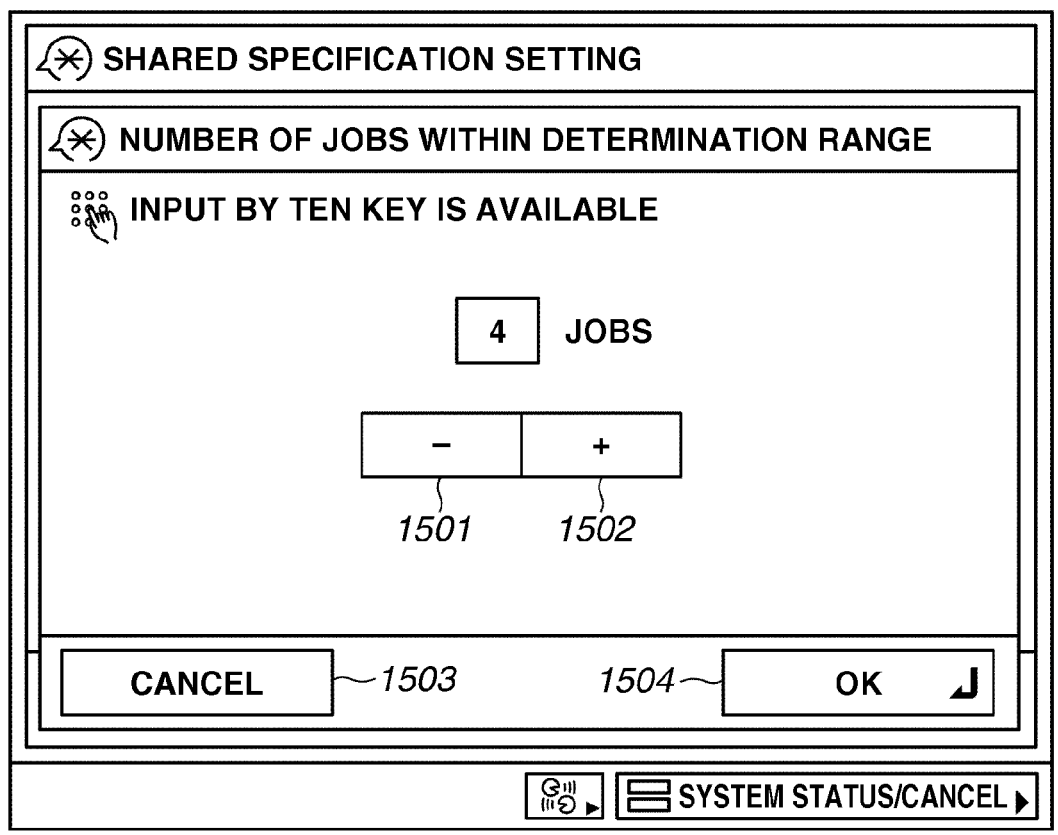
FIG. 15 illustrates a job number determination range setting screen displayed on the touch panel unit.

In step S305, the controller unit 205 obtains a numerical value indicating a job determination range set by using a user interface illustrated in FIG. 15, and the processing proceeds to step S306. In step S306, the controller unit 205 determines whether there is a job that requires the same type of pre-processing within the set job determination range based on the job that is being executed.

The numerical value indicating the job determination range is set by using the user interface illustrated in FIG. 15. The job determination range means the range of the number of jobs to be used for determining presence/absence of the job that requires the post-processing similar to that of the executed job among the jobs subsequent to the executed job. More specifically, when the job determination range is set as 4 jobs, 4 jobs on, which the print processing is performed earlier among the jobs requested to be executed and held in the HDD 209, are used for the post-processing determination in step S306.

The job determination range is configured to be set by the user. When the user instructs a change in setting of the job determination range by pressing down the shared specification setting button 801 using the user mode key 505, a screen for inputting the number of jobs for the determination range is displayed on the touch panel unit 401 by the controller unit 205.

FIG. 15 illustrates one example of the job number determination range setting screen displayed on the touch panel unit 401 illustrated in FIG. 4. Referring to FIG. 15, it is possible to change the job number determination range by way of a job number decrease button 1501 and a job number increase button 1502, and the job number determination range is held in the RAM 208 when the OK button 1504 is pressed down.

The present exemplary embodiment has the configuration in which the job number set by the user by way of the job number increase/decrease buttons 1501 and 1502 is received, and the controller unit 205 determines the job range for determining whether the warming-up processing is required in the group of the sheet processing apparatuses 200. A button 1503 is a cancel button.

The controller unit 205 obtains a number of jobs in the job determination range set in FIG. 15 in step S305 in FIG. 14, and the processing proceeds to step S306.

In step S306, the controller unit 205 determines whether there is the job requiring the same case binding processing within the job determination range, which is obtained in step S305, of the jobs held in the HDD 209. The processing proceeds to step S307 when the controller unit 205 determines that there is the job requiring the same case binding processing (YES in step S306), while the processing proceeds to step S308 when the controller unit 205 determines that no job requires the same case binding processing.

In step S307, the controller unit 205 performs power control for keeping the heater for melting the glue in the case binding machine 200b to a constant output to prevent glue solidification as the standby processing, and performs display control for returning to the basic screen illustrated in FIG. 7.

Meanwhile, in step S308, the controller unit 205 restricts or lowers the power of the heater for melting the glue in the case binding machine 200b as the sleep processing, and performs display control for returning to the basic screen illustrated in FIG. 7. When the case binding machine 200b includes the CPU, control for lowering the power of the heater is performed according to the controller unit 205.

With such configuration, it is possible to automatically perform the shifting to the standby mode or the power saving mode without user instructions given every time a job requiring warming-up is executed. For example, the power supply to the gluing unit is kept if a job requiring warming-up exists in the predetermined number of jobs set by the job determination range after the execution of the job requiring the warming-up. In other words, it is possible to shift the case binding machine to the standby mode.

Meanwhile, the power supply to the gluing unit is restricted or cut off if the job requiring warming-up does not exist in the predetermined number of jobs set in the job determination range after the execution of the job requiring the warming-up. In other words, it is possible to shift the case binding machine to the power saving mode.

Since the number, types, and execution order of jobs to be finished by an operator may be sometimes known before inputting the jobs into a printing system particularly in the POD market, it is possible to determine the job determination range based on the conditions.

By the above-described control, it is possible to achieve both of the improvement in job processing efficiency and the reduction in power consumption without performing the complicated processing of estimating the time to be elapsed until the start of a sheet processing of a job.

The present invention is not limited to the above-described exemplary embodiments. It is possible to make various modifications based on the gist of the present invention (including organic combinations of the exemplary embodiments), and the modifications are not excluded from the scope the present invention. For example, though the controller unit 205 in the printing apparatus 100 mainly performs above-described various controls in the present exemplary embodiments, the configuration may be modified into that in which apart or whole of the controls is executed by an external controller, which is separated from the printing apparatus 100.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-078982 filed Mar. 27, 2009, which is hereby incorporated by reference herein in its entirety.

What is claimed is:

1. An image processing apparatus, comprising:
   a storage unit configured to store a first print job and a second print job which is to be executed after the first print job;
   a sheet processing unit configured to cause a sheet processing apparatus to execute gluing processing of sheets after the sheets are printed by execution of the first print job;
   a power supply control unit configured to heat a heater for melting glue to be used in the gluing processing;
   a determining unit configured to determine whether the second print job requires the gluing processing; and
   a judgment unit configured to judge whether the second print job is a print job to be executed within a predetermined range after the execution of the first print job,
   wherein in a case where the determining unit determines that the second print job requires the gluing processing and the judgment unit judges that the second print job is a print job to be executed within the predetermined range after the execution of the first print job, the power supply control unit continues heating the heater during a period between the gluing processing for the first print job and the gluing processing for the second print job to prevent glue melted by executing the gluing processing for the first print job from becoming solidified.

2. An image processing apparatus according to claim 1, wherein the power supply control unit continues heating the heater during the period between the gluing processing for the first print job and the gluing processing for the second print job to prevent the glue melted by executing the gluing processing for the first print job from becoming solidified in a case where the second print job is to be executed within a predetermined number of print jobs after the first print job, and stops heating the heater in a case where the second print job is not to be executed within the predetermined number of print jobs after the first print job.

3. An image processing apparatus according to claim 2, further comprising
   a reception unit configured to receive an input of the predetermined number of print jobs from a user.

4. An image processing apparatus according to claim 1, further comprising
   a selecting unit configured to select, according to an instruction from a user, whether to continue heating the heater during the period between the gluing processing for the first print job and the gluing processing for the second print job when the determining unit determines that the second print job requires the gluing processing,
   wherein the power supply control unit continues heating the heater during the period between the gluing processing for the first print job and the gluing processing for the second print job when the selecting unit selects to continue heating the heater, and stops heating the heater after completion of the gluing processing for the first print job when the selecting unit selects to stop heating the heater.

5. An image processing apparatus according to claim 1, further comprising
   a display control unit configured to cause a display unit to display a timing for executing the second print job when the determining unit determines that the second print job requires the gluing processing.

6. A control method for controlling an image processing apparatus, comprising:
   storing, using a processor, a first print job and a second print job which is to be executed after the first print job;
   causing, using the processor, a sheet processing apparatus to execute a gluing processing of sheets after the sheets are printed by execution of the first print job;
   performing control, using the processor, to heat a heater for melting glue to be used in the gluing processing;
   determining, using the processor, whether the second print job requires the gluing processing; and
   judging whether the second print job is a print job to be executed within a predetermined range after the execution of the first print job,
   wherein in a case where it is determined that the second print job requires the gluing processing and that the second print job is a print job to be executed within the predetermined range after the execution of the first print job, the controlling step continues heating the heater during a period between the gluing processing for the first print job and the gluing processing for the second print job to prevent glue melted by executing the gluing processing for the first print job from becoming solidified.

7. A non-transitory computer readable storage medium storing computer-executable instructions for controlling an image processing apparatus which, when executed by a computer, cause the computer to perform operations comprising:
   storing, using a processor a first print job and a second print job which is to be executed after the first print job;
   causing, using the processor, a sheet processing apparatus to execute a gluing processing of sheets after the sheets are printed by execution of the first print job;
   performing control, using the processor, to heat a heater for melting glue to be used in the gluing processing;
   determining, using the processor, whether the second print job requires the gluing processing;
   judging whether the second print job is a print job to be executed within a predetermined range after the execution of the first print job,
   wherein in a case where it is determined that the second print job requires the gluing processing and that the second print job is a print job to be executed within the predetermined range after the execution of the first print job g, the controlling step continues heating the heater during a period between the gluing processing for the first print job and the gluing processing for the second print job to prevent glue melted by executing the gluing processing for the first print job from becoming solidified.

* * * * *